US 8,711,945 B2

(12) United States Patent
Henocq et al.

(10) Patent No.: US 8,711,945 B2
(45) Date of Patent: Apr. 29, 2014

(54) METHODS AND DEVICES FOR CODING AND DECODING IMAGES, COMPUTER PROGRAM IMPLEMENTING THEM AND INFORMATION CARRIER ENABLING THEIR IMPLEMENTATION (75) Inventors: Xavier Henocq, Mouaze (FR); Fabrice Le Leannec, Mouaze (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1329 days.

(21) Appl. No.: 11/856,375

(22) Filed: Sep. 17, 2007

(65) Prior Publication Data
US 2008/0075170 A1 Mar. 27, 2008

(30) Foreign Application Priority Data
Sep. 22, 2006 (FR) ...................................... 06 53914

(51) Int. Cl.
*H04N 7/12* (2006.01)

(52) U.S. Cl.
USPC ............. 375/240.24; 375/240.16; 375/240.18

(58) Field of Classification Search
None
See application file for complete search history.

(56) References Cited

U.S. PATENT DOCUMENTS

| 5,418,570 | A  | * | 5/1995  | Ueno et al. ................ 375/240.14 |
|-----------|----|---|---------|----------------------------------------|
| 5,974,184 | A  | * | 10/1999 | Eifrig et al. ..................... 382/236 |
| 6,510,177 | B1 | * | 1/2003  | De Bonet et al. ........ 375/240.16 |
| 6,661,841 | B2 | * | 12/2003 | Radha et al. ............... 375/240.1 |
| 6,788,740 | B1 | * | 9/2004  | van der Schaar et al. ..... 375/240 |
| 7,116,830 | B2 | * | 10/2006 | Srinivasan .................... 382/236 |
| 7,623,574 | B2 | * | 11/2009 | Holcomb ................. 375/240.16 |
| 7,664,177 | B2 | * | 2/2010  | Mukerjee ................. 375/240.13 |
| 7,933,337 | B2 | * | 4/2011  | Srinivasan et al. ........ 375/240.18 |
| 8,085,845 | B2 | * | 12/2011 | Tourapis et al. ......... 375/240.16 |
| 8,085,846 | B2 | * | 12/2011 | Tourapis et al. ......... 375/240.16 |
| 2003/0081233 | A1 | * | 5/2003 | Obrador ...................... 358/1.13 |
| 2004/0095333 | A1 | * | 5/2004 | Morag et al. ................... 345/173 |
| 2004/0131267 | A1 | * | 7/2004 | Adiletta et al. .............. 382/236 |
| 2004/0252758 | A1 | * | 12/2004 | Katsavounidis et al. .. 375/240.2 |

(Continued)

FOREIGN PATENT DOCUMENTS

EP  0 454 927  A2  12/1990

OTHER PUBLICATIONS

Tan, T.K. et al. "A Frequency Scalable Coding Scheme Employing Pyramid and Subband Techniques", IEEE Transactions on Circuits and Systems for Video Technology, vol. 4, No. 2, Apr. 1994, pp. 203-207.

(Continued)

*Primary Examiner* — Ayaz Sheikh
*Assistant Examiner* — Faiyazkhan Ghafoerkhan
(74) *Attorney, Agent, or Firm* — Fitzpatrick, Cella, Harper & Scinto (57) ABSTRACT

A method of coding a digital image which includes plural macroblocks of which one is designated as a "current" macroblock. Motion estimation is applied to the current macroblock and to at least one image designated as "reference", to obtain one or more first predictors in each reference image. A second predictor is obtained from a spatial scalability level lower than the spatial scalability level of the current macroblock. At least one of the first predictors is transformed from the spatial domain to the frequential domain. At least one low spatial frequency coefficient is predicted on the basis of the second predictor, and at least one high spatial frequency coefficient is predicted on the basis of at least one high frequency coefficient of the transformed first predictor.

23 Claims, 4 Drawing Sheets

(56) References Cited

U.S. PATENT DOCUMENTS

| | | | |
|---|---|---|---|
| 2005/0129121 A1* | 6/2005 | Sung | 375/240.16 |
| 2005/0195896 A1* | 9/2005 | Huang et al. | 375/240.03 |
| 2005/0265442 A1* | 12/2005 | Kim | 375/240.1 |
| 2005/0265444 A1* | 12/2005 | Kim | 375/240.1 |
| 2006/0165301 A1* | 7/2006 | Cha et al. | 382/240 |
| 2006/0165303 A1* | 7/2006 | Cha et al. | 382/240 |
| 2006/0245498 A1* | 11/2006 | Lee et al. | 375/240.16 |
| 2007/0009044 A1* | 1/2007 | Tourapis et al. | 375/240.25 |
| 2007/0047648 A1* | 3/2007 | Tourapis et al. | 375/240.13 |
| 2007/0064809 A1* | 3/2007 | Watanabe et al. | 375/240.16 |
| 2007/0291836 A1* | 12/2007 | Shi et al. | 375/240.01 |

OTHER PUBLICATIONS

Musmann, H.G., et al. "Coding Algorithms and VLSI Implementations for Digital TV and HDTV Satellite Broadcasting", European Transactions on Telecommunications and Related Technologies, AEI, Milano, IT, vol. 4, No. 1, 1993, pp. 11-21.

Puri, A. et al., "Spatial Dominian Resolution Scalable Video Coding", Proceedings of the SPIE, Bellingham, VA, US, vol. 2094, 1993, pp. 718-729.

Torres, L., et al. "High Compression of Faces in Video Sequences for Multimedia Applications", Multimedia and Expo, 2002. ICME '02. Proceedings. 2002 IEEE International Conference on Lausanne, Switzerland 26-29, vol. 1, Aug. 2002, pp. 481-484.

* cited by examiner

METHODS AND DEVICES FOR CODING AND DECODING IMAGES, COMPUTER PROGRAM IMPLEMENTING THEM AND INFORMATION CARRIER ENABLING THEIR IMPLEMENTATION

The present invention concerns methods and devices for coding and decoding images, a computer program implementing such methods and an information carrier readable by computer for implementing such methods. It applies, in particular, to video coders and decoders, and, more particularly, to video compression with spatial scalability, that is to say with adaptable image definition, generally termed "scalable". The objective of scalable compression is to generate video streams that are easily adaptable to the conditions of transmission, decompression or viewing of those video streams.

The present invention aims, in particular, to provide a simple solution linked to the functionality of spatial scalability of the "SVC" standard (acronym for "Scalable Video Coding"). SVC is a new video coding standard in course of preparation which should be finalized in 2006. SVC is being developed by the "JVT" group (acronym for "Joint Video Team"), which includes experts in video compression of the "MPEG" group (acronym for "moving picture expert group") of the ISO/IEC committee (acronym for "International Standardization Organization/International Electrotechnical Committee") and the video experts of the ITU (acronym for "International Telecommunications Union"). SVC is based on the video compression techniques of the "MPEG4-AVC" standard (AVC is the acronym for "Advanced Video Coding") also called "H.264" and seeks to extend it, in particular to give greater capacity of adaptation, termed "scalability", of the video format. More particularly, this new video format will have the possibility of being decoded differently depending on what is possible for the decoder and on the characteristics of the network.

Spatial scalability makes it possible to imbricate several different resolutions in the same video stream. This video stream is generally constituted by a basic stream containing a basic resolution and at least one improvement stream making it possible to increase the spatial resolution, relative to the basic resolution. The basic stream is identical to a non-scalable video stream. Its compression is, in general, based on what is designated a "hybrid" coding system, combining temporal prediction and spatial compression. The improvement stream is coded in the same way as the basic stream, except for the possible difference that it may also take advantage of the correlations it has with the basic stream.

The present invention is directed, in particular, to improving the compression rate of an improvement level.

As regards standardization, scalable video compression has appeared with the standards MPEG-2/H.262 and H.263. These two standards were capable of delivering video streams scalable spatially, temporally and in terms of quality. These standards were then followed by MPEG part 4 and now, by SVC (MPEG-4 part 10 AVC/H.264 amendment 3). This latter standard, which is still in course of standardization, will add new scalable compression tools to the group of functionalities already present.

Figure 1:
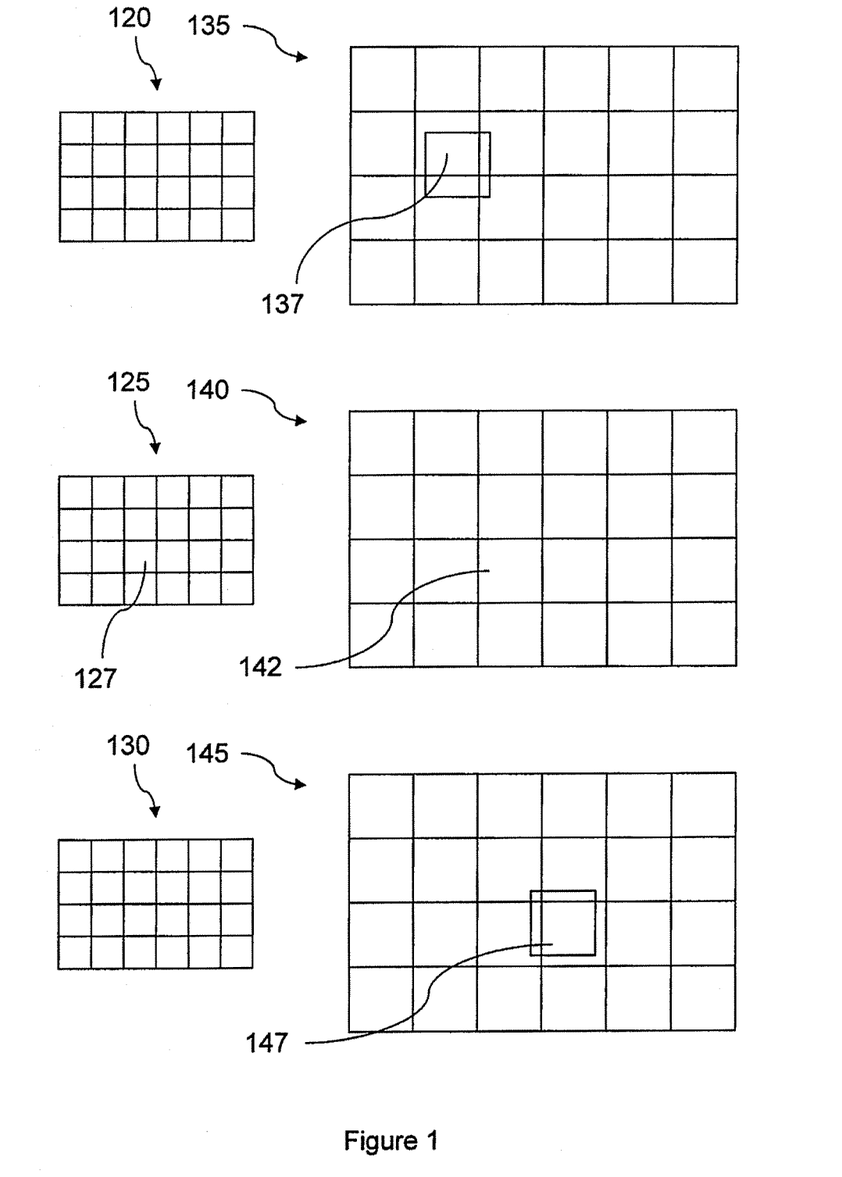
FIG. 1 is a diagram of the coding of a macroblock of an image to code, according to a particular embodiment of the coding method of the present invention.

SVC coding is based on AVC. AVC uses hybrid video coding based on motion prediction/compensation and spatial prediction/compression. In this coding system, each image is divided into macroblocks representing a set of pixels, which set may take a square or rectangular form. A coding mode is attributed to each macroblock, that mode being chosen from a set of predefined coding modes, according to a criterion linked to the rate and/or to the distortion. As represented in FIG. 1, SVC has defined a set of coding modes. This set comprises the following modes:

"Intra": spatial coding with which the macroblock is coded independently of any other information coming from other images, "Inter" or "P": coding using temporal prediction, that is to say information from other images. An inter macroblock is predicted from a region of the same size from a preceding image. What is referred to as a "block matching" algorithm makes it possible to define which is the region of the preceding image enabling the best prediction of the current macroblock. Next, there is only coded a motion vector describing the spatial relationship between that region and the current macroblock and a difference between the current macroblock and the region of the image serving for its prediction.

"B-forward": a "B-forward" macroblock belongs to a Bi-predicted image (which image may potentially be predicted from two reference images bounding it temporally). In the manner of an inter macroblock, a B-forward macroblock is predicted from a region taken in a preceding image.

"B-backward": a "B-backward" macroblock belongs to a Bi-predicted image and is predicted from a region taken in a following image and "B_bidir": a "B-bidir" macroblock belongs to a Bi-predicted image. This macroblock is predicted from two regions taken in two images bounding it temporally. For this macroblock, two motion vectors are coded. The residue of this macroblock is calculated by producing the difference between the current macroblock and the average of the two regions predicting it.

Other modes specific to spatial scalability are to be added to this group of modes:

"IntraBL": this coding mode makes it possible to predict a macroblock of an improvement level on the basis of the co-located macroblock, that is to say having the same spatial position, in the basic level. In this case use may be made of the term "upward" prediction from a lower spatial resolution level to a higher spatial resolution level. The interpolation of the macroblock of the basic level is thus carried out to bring it to the resolution of the improvement level. Next the difference between the current macroblock and the interpolated macroblock is coded.

prediction of motion vectors: in this coding mode, it is considered that a macroblock of an improvement level has the same motion as the co-located macroblock of the basic level with a factor of scale being the only difference. In this case, there is coded, at most, an precision increment of the motion vector of the basic macroblock.

residue prediction: in this coding mode, it is considered that a macroblock of an improvement level having motion close to that of the co-located macroblock of the basic level, also has a similar residue to that of the basic level.

Thus, the SVC proposes no coding mode combining a prediction on the basis of a lower spatial level and a temporal prediction on the basis of an image of the same level. In other words, in this standard, prediction is either on the basis of the basic level, or on the basis of the improvement level.

The present invention provides methods and devices making it possible to take advantage, conjointly, of the inter and intra level predictions of spatial scalability.

To that end, according to a first aspect, the present invention concerns a method of coding a digital image, which comprises, for at least one macroblock designated as "current" of said image:
- a step of motion estimation applied to said current macroblock and to at least one image designated as "reference" to obtain at least one first predictor in each reference image,
- a step of obtaining a second predictor from a spatial scalability level lower than the spatial scalability level of the current macroblock,
- a step of transforming, from the spatial domain to the frequential domain, at least one predictor representing at least one first predictor,
- a step of predicting at least one low spatial frequency coefficient on the basis of the second predictor and
- a step of predicting at least one high spatial frequency coefficient on the basis of at least one high frequency coefficient of at least one predictor representing at least one first predictor transformed to the frequential domain.

Tests on various image sequences have shown that the method as succinctly set forth above increases the compression performance, relative to the methods of the prior art. Furthermore, this method employs tools available in video codecs, which facilitates its implementation.

It is noted that the steps of predicting low and high spatial frequency coefficients make it possible to predict, respectively, the average of the current macroblock on the basis of a macroblock of a lower scalability level and the details of the current macroblock on the basis of the current scalability level.

According to particular features, the method as succinctly set forth above further comprises a step of transformation that is the inverse of the transformation carried out during the step of transformation to the frequential domain, applied to the predicted coefficients to form a macroblock.

By virtue of these provisions, the macroblock as it will be decoded is obtained at the coder and the coding and it is possible to improve the coding or determine whether other coding modes are better, according to a predetermined criterion.

According to particular features, during the step of obtaining a second predictor, the second predictor is co-located with the current macroblock.

By virtue of these provisions, it is not necessary to code a movement between the second predictor and the current macroblock and the coefficient of lowest frequency of the second predictor is equal to that of the current macroblock.

According to particular features, during the transformation step, the second predictor is furthermore transformed to the frequential domain.

According to particular features, during the step of predicting at least one low spatial frequency coefficient, at least one low spatial frequency coefficient is a coefficient of the second predictor transformed to the frequential domain.

By virtue of each of these provisions, several low frequency coefficients are available, that issued from the second predictor, and which may be employed during the step of predicting low frequency coefficients.

According to particular features, during the step of predicting at least one low spatial frequency coefficient, the predicted coefficient of lowest spatial frequency is an average, for the second predictor, of the pixel values of the image.

By virtue of these provisions, the coefficient of lowest spatial frequency is easy to determine, without it being necessary to apply a transformation, to the frequential domain, of the second predictor.

According to particular features, the coding method as succinctly set forth above comprises a step of comparing the macroblock issuing from the inverse transformation with at least one macroblock issuing from at least one other coding method and, if this comparison is favorable according to at least one predetermined criterion, a step of calculating and coding residues and motion vectors applied to the macroblock corresponding to said predicted high and low frequency coefficients.

By virtue of these provisions, the coding resulting from the implementation of the method of the present invention, is only applied to a macroblock if it gives a better result than another coding method. The quality and/or the compression rate are thus further improved.

According to particular features, during the step of transforming at least one predictor representing each first predictor from the spatial domain to the frequential domain, each first predictor is transformed.

According to particular features, during the step of predicting at least one high spatial frequency coefficient on the basis of at least one high frequency coefficient of at least one predictor representing at least one first predictor transformed to the frequential domain, an average is calculated for coefficients of first predictors transformed to the frequential domain.

By virtue of each of these provisions, the present invention applies to the case in which a single first predictor is employed and to the case in which several first predictors are transformed to the frequential domain before being processed to determine high frequency coefficients, for example, by choosing the average of the coefficients of the first predictors transformed to the frequential domain.

According to particular features, during the step of transforming at least one predictor representing each first predictor from the spatial domain to the frequential domain, transformation is carried out of a predictor formed by an average, pixel by pixel, of a plurality of first predictors.

By virtue of these provisions, the consumption of resources is limited, compared to the transformation to the frequential domain of a plurality of first predictors.

According to particular features, during the step of obtaining a second predictor, an interpolating step is applied to a macroblock co-located with said current macroblock, in a lower scalability level, to obtain the second predictor of the same resolution as the current macroblock.

By virtue of these provisions, the different predictors, or their coefficients once those predictors have been transformed to the frequential domain, may easily be combined.

According to a second aspect, the present invention concerns a method of decoding a digital image, which, to form at least one current macroblock of a higher resolution level of said image, comprises,
- a step of determining at least one low frequency coefficient on the basis of a macroblock, designated as "second predictor", of a resolution level lower than the resolution level of the current macroblock to form,
- a step of decoding at least one motion vector,
- a step of determining at least one first predictor on the basis of each decoded motion vector and of at least one image designated as "reference",
- a step of determining at least one high frequency coefficient on the basis of coefficients of at least one transform, to the frequential domain, of at least one predictor representing at least one first predictor and a step of transforming, to the spatial domain, said low and high frequency coefficients.

According to particular features, the decoding method as succinctly set forth above further comprises a step of decoding a residue and a step of combining said residue and a macroblock obtained by said step of transforming said low and high frequency coefficients to the spatial domain to form a decoded macroblock.

According to particular features, the second predictor is co-located with the current macroblock.

According to particular features, the decoding method as succinctly set forth above further comprises a step of transforming the second predictor to the frequential domain, during the step of determining at least one low frequency coefficient, said low frequency coefficient being on the basis of at least one coefficient of the transform, to the frequential domain, of the second predictor.

According to particular features, the decoding method as succinctly set forth above further comprises a step of determining an average, for the second predictor, of pixel values of the image, during the step of determining at least one low frequency coefficient, said coefficient of lowest frequency being equal to said average.

According to particular features, at least one predictor representing each first predictor is a first predictor.

According to particular features, during the step of determining at least one high frequency coefficient, an average is calculated for coefficients of transforms, to the frequential domain, of first predictors.

According to particular features, a predictor representing each first predictor is unique and, as coefficients, possesses averages of coefficients of first predictors transformed to the frequential domain.

According to particular features, during the step of determining at least one low frequency coefficient on the basis of the second predictor, an interpolating step is carried out on said second predictor to obtain the second predictor of the same resolution as the current macroblock.

According to a third aspect, the present invention concerns a device for coding a digital image, which comprises:

a means for motion estimation adapted to perform an estimation of motion between at least one macroblock designated as "current" of said image and at least on image designated as "reference" to obtain at least one first predictor in each reference image, a means for obtaining, for said current macroblock, a second predictor of a spatial scalability level lower than the spatial scalability level of the current macroblock, a means for transforming, from the spatial domain to the frequential domain, at least one predictor representing at least one first predictor, a means for predicting at least one low spatial frequency coefficient on the basis of the second predictor and a means for predicting, for the current macroblock, at least one high spatial frequency coefficient on the basis of at least one high frequency coefficient of at least one predictor representing at least one first predictor transformed to the frequential domain.

According to a fourth aspect, the present invention concerns a device for decoding a digital image, which comprises:

a means for determining at least one low frequency coefficient on the basis of a macroblock designated as "second predictor", of a resolution level lower than the resolution level of a current macroblock of the image to form, a means for decoding at least one motion vector for the current macro block, a means for determining at least one first predictor for the current macroblock, on the basis of each decoded motion vector and of at least one image designated as "reference", a means for determining, for the current macroblock, at least one high frequency coefficient on the basis of coefficients of at least one transform, to the frequential domain, of at least one predictor representing at least one first predictor and a means for transforming, for the current macroblock, to the spatial domain, said low and high frequency coefficients.

According to a fifth aspect, the present invention concerns a computer program loadable into a computer system, said program containing instructions enabling the implementation of the coding method as succinctly set forth above and/or of the decoding method as succinctly set forth above, when that program is loaded and executed by a computer system.

According to a sixth aspect, the present invention concerns an information carrier readable by a computer or a microprocessor, removable or not, storing instructions of a computer program, characterized in that it enables the implementation of the coding method as succinctly set forth above and/or of the decoding method as succinctly set forth above.

As the advantages, objects and particular features of this coding device, of this decoding method, of this decoding device, of this computer program and of this information carrier are similar to those of the coding method, as succinctly set forth above, they are not repeated here.

Other advantages, objects and particular features of the present invention will emerge from the following description, given, with an explanatory purpose that is in no way limiting, with respect to the accompanying drawings in which.

The present invention combines intra and inter level predictions of spatial scalability levels. In the following portion of the description, the coding method of the present invention is termed "FBU" (acronym for Forward Backward and Upward).

In a preferred embodiment adapted to integrate into the SVC standard, this new coding mode may take several forms:

"inter_FBU": combining a forward prediction and an upward prediction in the P images;

"forward_FBU": combining a forward prediction and an upward prediction in the B images;

"backward_FBU": combining a backward prediction and an upward prediction in the B images and "bidir_FBU": combining a bidirectional prediction and an upward prediction in the B images.

In the whole of the description, the terms "scalability level" and "resolution level" are used indiscriminately.

FIGS. 1 to 4 illustrate an embodiment of the invention in which coding is carried out of "bidir_FBU" type corresponding to a prediction combination of bidirectional type to obtain two first predictors of "upward" type to obtain a second predictor. The adaptation to the other coding modes is easily within the capability of the person skilled in the art, a single first predictor then being obtained.

FIGS. 1 to 4 are limited to the case in which only two scalability levels are implemented. However, the present invention is not limited to that particular case, but extends, quite to the contrary, to all coding implementing a plurality of scalability levels.

In FIG. 1 there are represented, one below the other and for three successive images of a sequence of images, on the left, an image of lower resolution or scalability level, for example of basic resolution or scalability level, respectively 120, 125 and 130 and, on the right, an image of higher resolution or scalability level, respectively 135, 140 and 145. The image 140 represented aligned centrally is the image in course of coding. It is designated as "current image". Each image 120 to 145 is composed of the same number of macroblocks, in a manner known per se. In the interest of clarity, the number of square macroblocks of each image has been limited to 24 in FIG. 1. However, the coding method of the present invention may be applied to all the possible forms of macroblock, for example with dimensions 16×16, 8×16, 16×8, 8×8, 8×4, 4×8 and 4×4 pixels.

It is to be noted that, when the coding only employs two resolution or scalability levels, the lower resolution level is termed "basic level" and the higher resolution level is termed "improvement level".

Macroblocks which have the same positions in two different images are termed "co-located", it being noted that the macroblocks of the images of lower resolution have a smaller number of pixels than the macroblocks of the images of higher resolution.

The coding of a macroblock in accordance with the coding method of the present invention solely concerns the improvement levels.

To illustrate the "bidir_FBU" coding, a macroblock 142 has been representing in FIG. 1, of the image of higher resolution 140 coded with reference to:
  a region 137 of the preceding higher resolution of the image 135, which region has the same dimensions as the macroblock 142, designated as "first predictor",
  a region 147 of the following higher resolution of the image 145, which region has the same dimensions as the macroblock 142, designated as "first predictor" and
  a co-located macroblock 127 of the image of lower resolution 125, designated as "second predictor", just as it is or once interpolated to obtain a higher resolution level.

Figure 2:
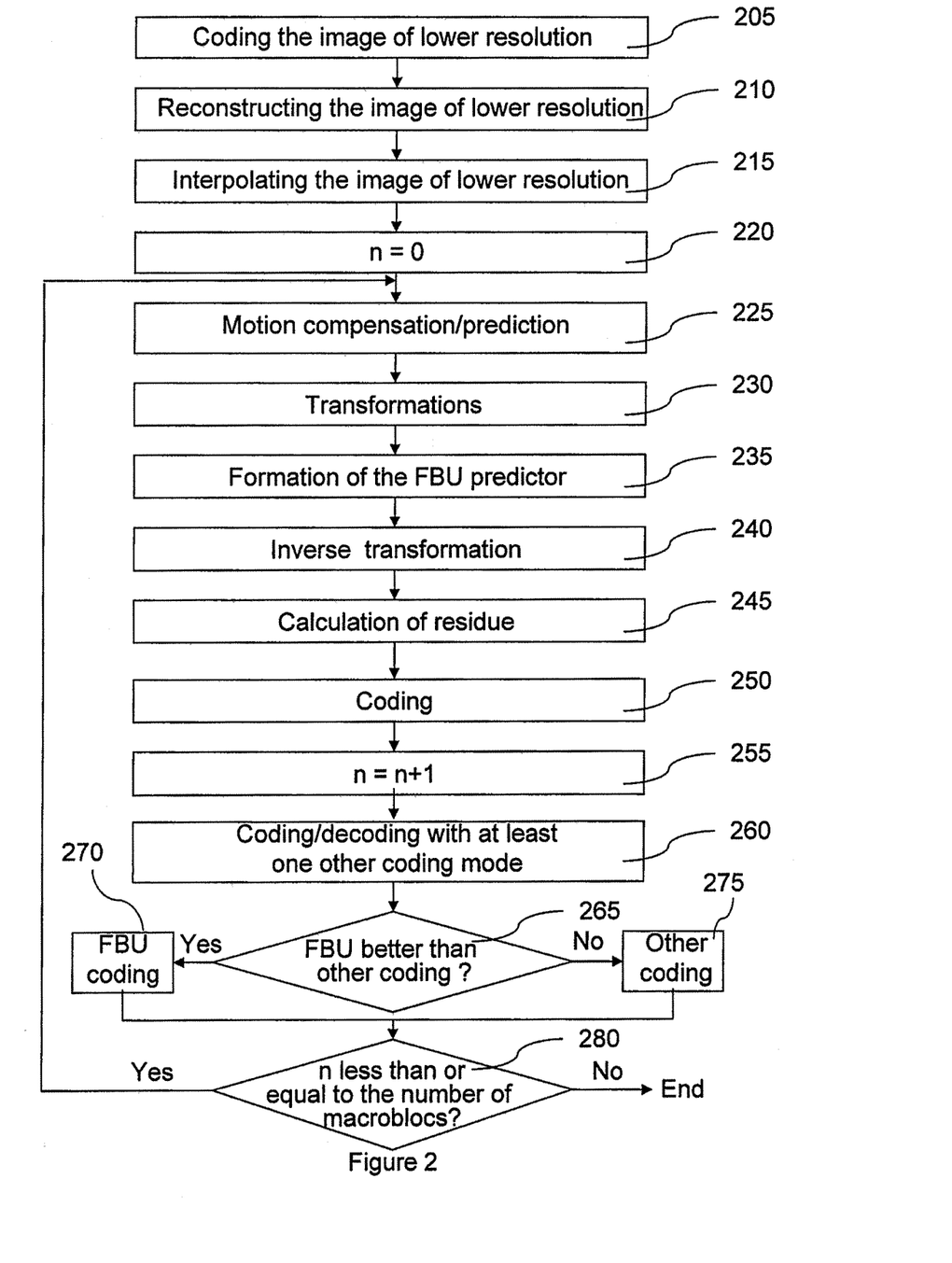
FIG. 2 is a representation, in the form of a logigram, of the steps implemented in a particular embodiment of the coding method of the present invention.

As illustrated in FIG. 2, a particular embodiment of the coding method of the present invention commences, for an image designated as "current", with the coding of the image 125 of the lower resolution level having the same temporal index as the current image, step 205. This image 125 is then reconstructed during a step 210, then interpolated, during a step 215, in order for it to take the resolution of the higher resolution level. As these three steps are conventional in an SVC coder, since they are necessary on coding "intraBL" macroblocks, they are not further described here.

During a step 220, a variable n is initialized to the value "0", the variable n serving to count the macroblocks of the current image. The following steps, 225 to 280, are carried out for each macroblock of the image 140 of higher resolution level of the current image.

For the macroblock of index n, the motion prediction is carried out, in a manner known per se, to determine a first predictor in each reference image of the same higher resolution level, then the motion compensation is carried out of each first predictor during a step 225. In the case of the "bidir_FBU" coding mode, the prediction/compensation is made with respect to two reference images. During the step 225, two motion vectors are thus obtained making it possible to compensate two first predictors for motion. Next, a predictor designated as "final" is determined, by calculating the average, pixel by pixel, of the first two predictors.

It is noted that, in the "inter_FBU", "forward_FBU" and "backward_FBU" coding modes not shown, only a first predictor would have been obtained during step 225. This first predictor would thus have directly constituted the final predictor of the higher resolution or scalability level.

Step 225 is followed by the transformation from the spatial domain to the frequential domain (for example a discrete cosine transformation known as DCT is used) of not only the final predictor but also the second predictor that is constituted by the interpolated co-located macroblock of the image of lower scalability level, during a step 230.

It is to be recalled here that a transformed macroblock is constituted by low and high frequency coefficients. In a transformed macroblock, the coefficients are put in order of increasing frequency in rows and columns. The coefficient situated at top left is the coefficient of lowest frequency termed "DC" coefficient, and represents the average of the block. The other coefficients are coefficients representing the medium and high spatial frequencies and are termed "AC" coefficients. In the context of the invention a subset of coefficients situated at the upper left of the macroblock, including the DC coefficient and a portion of the neighboring AC coefficients, are termed low frequency coefficients. The other coefficients are high spatial frequency coefficients.

It is noted that this transformation may be partial, especially for the second predictor, in particular if a small number of coefficients of the transform of the second predictor are used in the following step 235.

Next there is formed a version transformed in the frequential domain of a predictor termed "FBU" by combining the coefficients of the transformed versions of the final predictor and of the second predictor, at a step 235.

In a preferred embodiment, the DC coefficient of the transformed version of the FBU predictor is predicted as equal to the DC coefficient of the transformed version of the second predictor, coming from the lower scalability level and the AC coefficients are predicted from the transform of the final predictor.

In other embodiments of the method of the present invention, the DC coefficient is predicted from a combination of the transformation into frequencies of the final predictor and of the second predictor and/or at least one AC coefficient is predicted either from the transformation into frequencies of the first predictor, or from the transformation into frequencies of the final predictor, or by combination, for example linear, of those two transformations into frequencies. According to an alternative, a sub-set of coefficients referred to as low frequency (for example the DC coefficient and the three neighboring AC coefficients) are predicted from the transformed version of the second predictor, and the other remaining AC coefficients are predicted from the final predictor.

The formation of the FBU predictor is followed by its inverse transformation, during a step 240. Next, the residue is calculated by subtracting the FBU predictor from the original macroblock during a step 245. This residue and the motion vectors which are associated with it are then coded during a step 250.

Next the value of the variable n is incremented to pass to the following macroblock, during a step 255. Next, during a step 260, the coding and the decoding of the image is carried out with at least one other coding mode known to the person skilled in the art. During a step 265, it is determined whether, for a predetermined criterion, for example a rate-distortion criterion known to the person skilled in the art, the FBU coding is better than each other form of coding used during the step 260. If yes, during a step 270, the FBU coding is used for the current image. If no, during a step 275, the best coding type is used for the current image.

During a step 280, it is determined whether the index n is less than or equal to the total number of macroblocks contained in an image. If yes, step 225 is returned to. If no, the coding of the image in course is terminated and the coding of the following image is proceeded to, if there is one to code.

In variants, the transform to the frequential domain of each first predictor is carried out and then a linear combination of the coefficients of those transforms is made, for example the average, before determining the coefficients of the FBU predictor.

In variants, the step 215 of interpolating the second predictor is not carried out, but a transformation to the frequential domain of the second predictor is made and an interpolation is carried out of the coefficients of the transform so constituted.

In variants, the step 215 of interpolating the second predictor is not carried out, and, during step 230, neither the transform to the frequential domain of the second predictor is carried out, nor its interpolation, but only the average of its pixels is determined, to form the DC coefficient used to determine the DC coefficient of the FBU predictor.

In variants, several iterations of the steps 235 to 245 are carried out using different combinations of the coefficients of the transforms, to the frequential domain, of the final predictor and of the second predictor and determination is made, for example depending on the same criterion as that used during the step 265, of the best of their combinations. In this case, an identifier of that combination is associated with the coded data and transmitted to the decoding device, the latter using that identifier to reproduce that combination. For example, the combinations tested during the iterations of the steps 235 to 245 use, to constitute a coefficient of the FBU predictor, one or other of the coefficients of the final transformed predictor or of the second transformed predictor, the identifier of the combination then being an identifier of the coefficients which come from the second predictor. Of course, known methods of combination optimization, for example neural networks or expert systems, could be used to accelerate and/or optimize the search for the best combination.

In variants, the same iterations of the steps 235 to 245 are carried out on the first transformed predictors independently of the frequential domain, the combination of coefficients sought for each coefficient of the FBU predictor then combining the three corresponding coefficients coming from the transforms to the frequential domain of the first two predictors and of the second predictor. For example, the average is calculated for the coefficients of the first predictors transformed to the frequential domain, this average being used to form coefficients of the FBU predictor, in the frequential domain.

Any combination of the features of the variants set forth above constitutes a variant of the method of the present invention.

Figure 3:
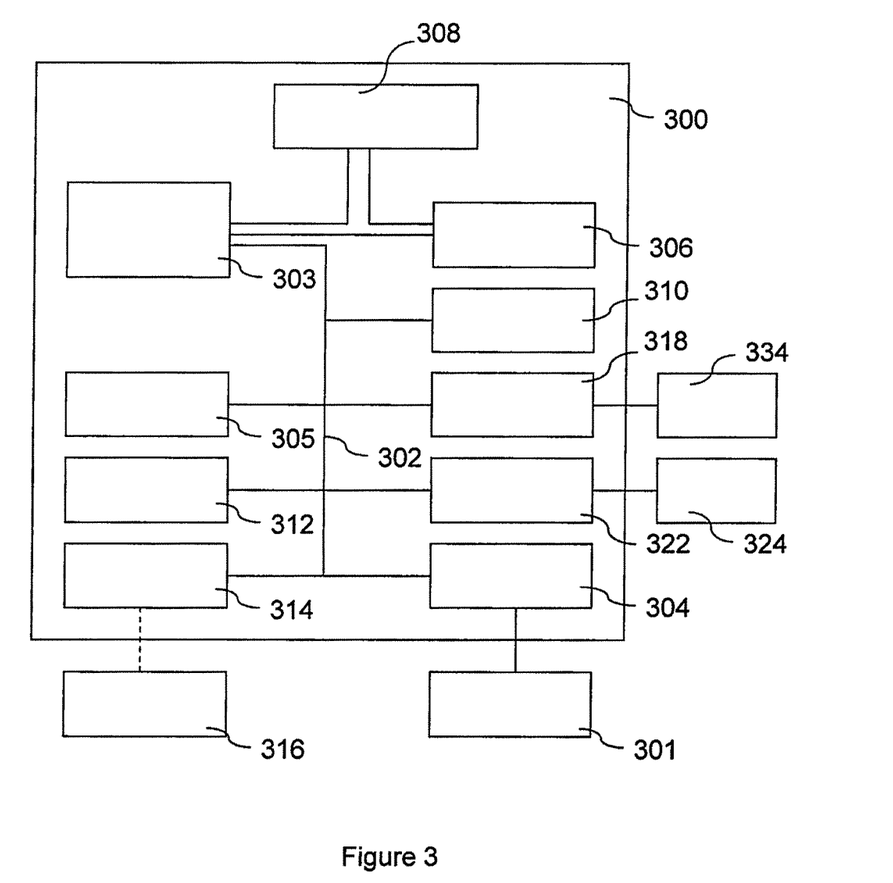
FIG. 3 represents a particular embodiment of the coding device of the present invention and FIG. 4 is a representation, in the form of a logigram of the steps implemented in a particular embodiment of the decoding method of the present invention.

FIG. 3 shows a particular embodiment of the device of the present invention, coder and/or decoder 300, and different peripherals adapted to implement each aspect of the present invention. In the embodiment illustrated in FIG. 3, the device 300 is a micro-computer of known type connected, in the case of the coder, via a graphics card 304, to a means for acquisition or storage of images 301, for example a digital camera or a scanner, adapted to provide image information to compress.

The device 300 comprises a communication interface 318 connected to a network 334 able to transmit, as input, digital data to compress or decompress and, as output, data compressed or decompressed by the device. The device 300 also comprises a storage means 312, for example a hard disk, and a drive 314 for a diskette 316. The diskette 316 and the storage means 312 may contain data to compress or decompress, compressed or decompressed data and a computer program adapted to implement the method of coding or decoding of the present invention.

According to a variant, the program enabling the device to implement the present invention is stored in ROM (read only memory) 306. In another variant, the program is received via the communication network 334 before being stored.

The device 300 is, optionally, connected to a microphone 324 via an input/output card 322. This same device 300 has a screen 305 for viewing the data to be to compressed or decompressed or for serving as an interface with the user for parameterizing certain operating modes of the device 300, using a keyboard 310 and/or a mouse for example.

A CPU (central processing unit) 303 executes the instructions of the computer program and of programs necessary for its operation, for example an operating system. On powering up of the device 300, the programs stored in a non-volatile memory, for example the read only memory 306, the hard disk 312 or the diskette 316, are transferred into a random access memory RAM 308, which will then contain the executable code of the program of the present invention as well as registers for storing the variables necessary for its implementation.

Naturally, the diskette 316 may be replaced by any type of removable information carrier, such as a compact disc, memory card or key. In more general terms, an information storage means, which can be read by a computer or microprocessor, integrated or not into the device, and which may possibly be removable, stores a program of the present invention. A communication bus 302 affords communication between the different elements included in the device 300 or connected to it. The representation, in FIG. 3, of the bus 302 is non-limiting and in particular the central processing unit 303 unit may communicate instructions to any element of the device 300 directly or by means of another element of the device 300.

The device described here and, particularly, the central processing unit 303, may implement all or part of the processing operations described with reference to FIGS. 1 to 2, to implement each method of the present invention and constitute each device of the present invention.

Figure 4:
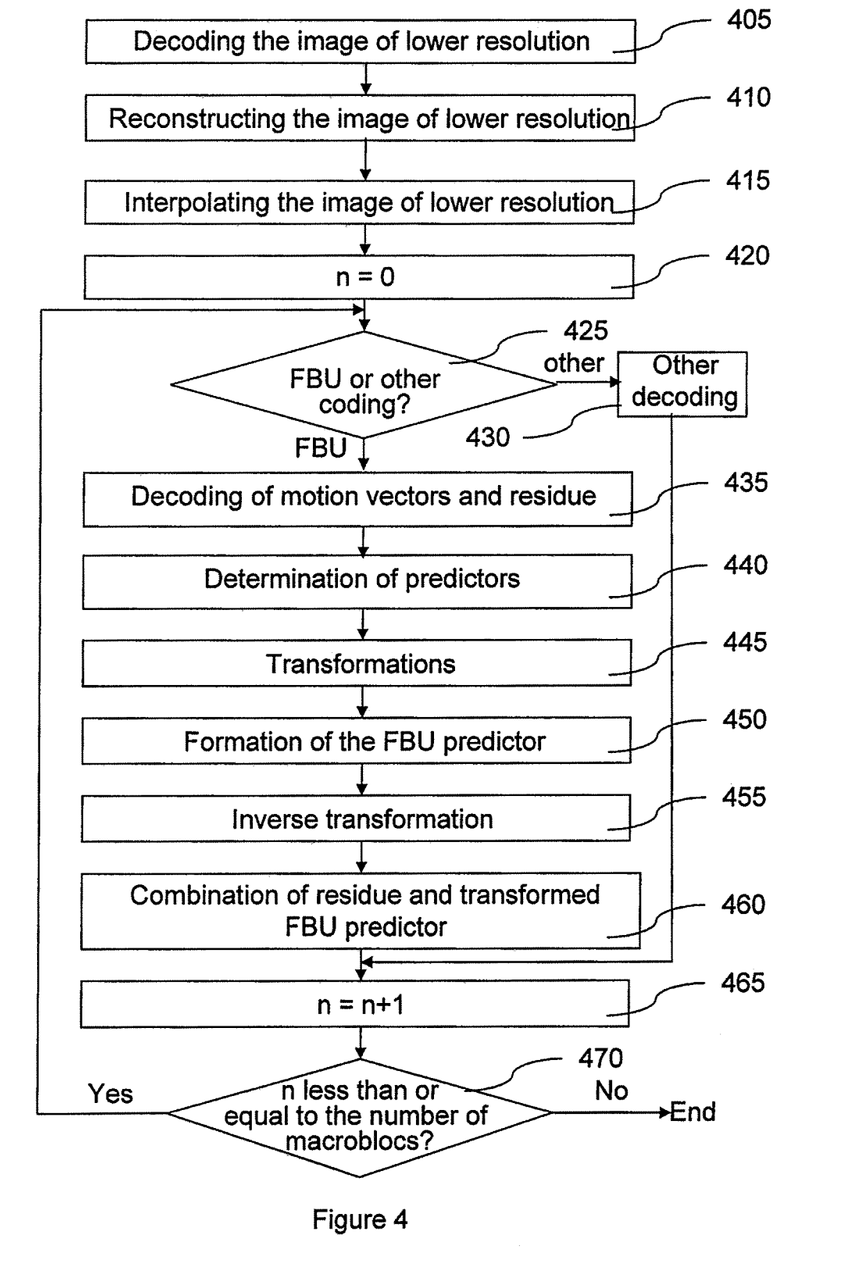

In FIG. 4 a step 405 can be seen of decoding an image of resolution lower than the resolution of the image to form and a step 410 of reconstruction, known per se, of the image of lower resolution.

Next, during a step 415, an interpolation of the image of lower resolution is carried out to give it the same resolution as that of the image to form.

During a step 420, a variable n is initialized to the value "0", the variable n serving to count the macroblocks of the current image. The following steps, 425 to 470, are carried out for each macroblock of the image to form.

During a step 425, it is determined whether the current macroblock, of index n, has been coded by employing the FBU coding of the present invention, or by employing another type of coding, of known type. If another type of coding was employed, the decoding of the current macroblock is carried out during a step 430, in a manner known per se, and the step 465, is proceeded to, described further on.

If the FBU was used for the current macroblock, the decoding of each motion vector and of the residue is carried out during a step 435. Next, the first predictors are determined by employing one of the motion vectors for each of them, during a step 440, and a first predictor, designated as "final", is formed by calculating the average, pixel by pixel, of the values taken by the first predictors.

During a step 445, the transformation to the frequential domain is carried out of the final first predictor and of the macroblock co-located in the image of lower resolution level, designated as "second predictor".

During a step 450, the FBU predictor is formed in the frequential domain, by combining coefficients of the transforms to the frequential domain of the final first predictor and of the second predictor, in the same manner as during the step 235 described above.

During a step 455, the transformation to the spatial domain is carried out of the FBU predictor formed in the frequential domain.

During a step 460, combination is made of the residue and the FBU predictor transformed to the spatial domain.

During the step 465, the value of the variable n is incremented by 1.

During a step 470, it is determined whether the index n is less than or equal to the total number of macroblocks contained the image to form. If yes, step 425 is returned to. If no, the decoding of the image in course is terminated and the decoding of the following image is proceeded to, if there is one to decode.

In variants corresponding to variants of the coding method described above, the transform to the frequential domain of each first predictor is carried out and then a linear combination of the coefficients of those transforms is made, for example the average, before determining the coefficients of the FBU predictor.

In variants corresponding to variants of the coding method described above, the step 415 of interpolating the second predictor is not carried out, but a transformation to the frequential domain of the second predictor is made and an interpolation is carried out of the coefficients of the transform so constituted.

In variants corresponding to variants of the coding method described above, the step 415 of interpolating the second predictor is not carried out, and, during step 445, neither the transform to the frequential domain of the second predictor is carried out, nor its interpolation, but only the average of its pixels is determined, to form the DC coefficient used to determine the DC coefficient of the FBU predictor.

In variants corresponding to variants of the coding method described above, an identifier is received of the coefficients of the transformed predictors which were combined on coding and those coefficients and their combination are employed to form the FBU predictor.

The combination of the coefficients coming from the second predictor and from the final first predictor is thus either predetermined, i.e. known in advance in the decoding method, as described with regard to the Figures, or determined by optimization as described above in a variant of the coding method, in which case that combination is indicated to the decoder via, for example, an additional item of information transported within the coded data.

In variants, during the steps 440 to 450, the first predictors are not combined into a final first predictor, but are processed and transformed independently to the frequential domain, the combination of coefficients used for each coefficient of the FBU predictor then combining the three corresponding coefficients coming from the transforms to the frequential domains of the two first predictors and of the second predictor. For example, the average is calculated for the coefficients of the first predictors transformed to the frequential domain, this average being used to form coefficients of the FBU predictor, in the frequential domain.

Any combination of the features of the variants set forth above constitutes a variant of the method of the present invention.

The invention claimed is:

1. A method of coding a digital image which includes plural macroblocks of which one macroblock is designated as a current macroblock, the method comprising: a step of motion estimation applied to said current macroblock and to at least one reference image to obtain one or more first macroblock predictors for a current block in each reference image, a step of obtaining a second macroblock predictor for the current block from a spatial scalability level lower than a spatial scalability level of the current macroblock, a step of transforming, from a spatial domain to a frequency domain, at least one of the one or more first macroblock predictors, a step of predicting in the frequency domain at least one low spatial frequency coefficient on the basis of the second macroblock predictor and a step of predicting in the frequency domain at least one high spatial frequency coefficient on the basis of at least one high frequency coefficient of the at least one transformed first macroblock predictor.

2. The method of claim 1, that further comprises a step of transforming that is an inverse of the transforming carried out during the step of transforming to the frequency domain, applied to the predicted at least one high and at least one low spatial frequency coefficients to form a macroblock.

3. The method of claim 1, wherein, during the step of obtaining a second macroblock predictor, the second macroblock predictor is co-located with the current macroblock.

4. The method of claim 1, wherein, during the transformation step the second macroblock predictor is furthermore transformed to the frequency domain.

5. The method of claim 4, wherein, during the step of predicting in the frequency domain at least one low spatial frequency coefficient, at least one low spatial frequency coefficient is a coefficient of the second macroblock predictor transformed to the frequency domain.

6. The method of claim 1, wherein, during the step of predicting in the frequency domain at least one low spatial frequency coefficient, the at least one predicted coefficient of low spatial frequency is an average of pixel values of the second macroblock predictor.

7. The method of claim 1, that further comprises a step of comparing a macroblock issuing from an inverse transformation with at least one macroblock issuing from at least one other coding method and, if this comparison is favorable according to at least one predetermined criterion, a step of calculating and coding residues and motion vectors applied to the macroblock corresponding to said predicted high and low spatial frequency coefficients.

8. The method of claim 1, wherein, during the step of transforming at least one of the first macroblock predictors, all of the one or more first macroblock predictors are transformed.

9. The method of claim 1, wherein, during the step of predicting in the frequency domain at least one high spatial frequency coefficient, an average is calculated for coefficients of the one or more first macroblock predictors transformed to the frequency domain.

10. The method of claim 1, wherein, during the step of transforming at least one of the one or more first macroblock predictors, transformation is carried out of a predictor formed by an average, pixel by pixel, of a plurality of the one or more first macroblock predictors.

11. The method of claim 1, wherein, during the step of obtaining a second macroblock predictor, an interpolating step is applied to a macroblock co-located with said current macroblock, in a lower scalability level, to obtain the second macroblock predictor of a same resolution as the current macroblock.

12. A method of decoding at least one current macroblock of a digital image, to form the current macroblock at a higher resolution level of said digital image, the method comprising: a step of determining in a frequency domain at least one low frequency coefficient on the basis of a second macroblock predictor, wherein the second macroblock predictor for a current block corresponds to a macroblock of a resolution level lower than the resolution level of the current macroblock, a step of decoding at least one motion vector, a step of determining one or more first macroblock predictors for the current block on the basis of each decoded motion vector and on the basis of at least one reference image, a step of determining in the frequency domain at least one high frequency coefficient on the basis of coefficients of a transform, to the frequency domain, of at least one of the first macroblock predictors, and a step of transforming, to a spatial domain, said low and high frequency coefficients.

13. The method of claim 12, that further comprises a step of decoding a residue and a step of combining said residue and a macroblock obtained by said step of transforming said low and high frequency coefficients to the spatial domain to form a decoded macroblock.

14. The method of claim 12, wherein the second macroblock predictor is co-located with the current macroblock.

15. The method of claim 12, that further comprises a step of transforming the second macroblock predictor to the frequency domain, during the step of determining in the frequency domain at least one low frequency coefficient, said low frequency coefficient being determined on the basis of at least one coefficient of the transform, to the frequency domain, of the second macroblock predictor.

16. The method of claim 12, that further comprises a step of determining an average, for the second macroblock predictor, of pixel values of the digital image, during the step of determining in the frequency domain at least one low frequency coefficient, said coefficient of low frequency being equal to said average.

17. The method of claim 12, wherein, during the step of determining in the frequency domain at least one high frequency coefficient, an average is calculated for coefficients of transforms, to the frequency domain, of all of the one or more first macroblock predictors.

18. The method of claim 12, wherein among the one or more first macroblock predictors there is a unique first macroblock predictor which, as coefficients, possesses averages of coefficients of the one or more first macroblock predictors transformed to the frequency domain.

19. The method of claim 12, wherein, during the step of determining in the frequency domain at least one low frequency coefficient on the basis of the second macroblock predictor, an interpolating step is carried out on said second macroblock predictor to obtain the second macroblock predictor of the same resolution as the current macroblock.

20. A device for coding a digital image, that comprises: a motion estimator that performs an estimation of motion between at least one current macroblock of said digital image and at least one reference image, to obtain one or more first macroblock predictors for a current block in each reference image, a means for obtaining, for said at least one current macroblock, a second macroblock predictor of a spatial scalability level lower than a spatial scalability level of the current macroblock, a means for transforming, from a spatial domain to a frequency domain, at least one of the one or more first macroblock predictors, a low frequency predictor for predicting in the frequency domain at least one low spatial frequency coefficient on the basis of the second macroblock predictor, and a high frequency predictor for predicting in the frequency domain, for the current macroblock, at least one high spatial frequency coefficient on the basis of at least one high frequency coefficient of the transformed one or more first macroblock predictor.

21. A device for decoding a digital image that comprises: a means for determining in a frequency domain at least one low frequency coefficient on the basis of a second macroblock predictor for a current block, wherein the second macroblock predictor corresponds to a macroblock of a resolution level lower than a resolution level of a current macroblock of the digital image, a decoder for decoding at least one motion vector for the current macroblock, a means for determining one or more first macroblock predictors for the current macroblock, on the basis of each decoded motion vector and on the basis of at least one reference image, a means for determining in the frequency domain, for the current macroblock, at least one high frequency coefficient on the basis of coefficients of a transform, to the frequency domain, of at least one of the one or more first macroblock predictors, and a means for transforming, for the current macroblock, to a spatial domain, said low and high frequency coefficients.

22. A non-transitory computer-readable storage medium which stores a program which causes a computer to execute the coding method of claim 1.

23. A non-transitory computer-readable storage medium which stores a program which causes a computer to execute the decoding method of claim 12.

* * * * *